C. JONES.
AUTOMOBILE POWER JACK.
APPLICATION FILED DEC. 22, 1916.

1,258,779.

Patented Mar. 12, 1918.

INVENTOR:
CHARLES JONES
By Earl M. Sinclair
Atty.

UNITED STATES PATENT OFFICE.

CHARLES JONES, OF WEBSTER CITY, IOWA.

AUTOMOBILE POWER-JACK.

1,258,779.     Specification of Letters Patent.     Patented Mar. 12, 1918.

Application filed December 22, 1916. Serial No. 138,316.

*To all whom it may concern:*

Be it known that I, CHARLES JONES, citizen of the United States of America, and resident of Webster City, Hamilton county, Iowa, have invented a new and useful Automobile Power-Jack, of which the following is a specification.

The object of this invention is to provide an improved power attachment adapted to be actuated by the rear drive wheels of an automobile to supply power to a transmission member such as a belt pulley.

A further object of this invention is to provide improved means for elevating the rear drive wheels of an automobile and transmitting power from such wheels.

A further object of this invention is to provide improved means for applying an automobile axle to the transmission apparatus.

A further object of this invention is to provide improved means for adapting the device to different sizes of drive wheels.

A further object of this invention is to provide improved means for maintaining the automobile axle in the elevated position, yielding means being provided to permit a slight movement of the drive wheels relative to the pulleys at times.

A further object of this invention is to provide improved means for transporting the device.

My invention consists in the construction, arrangement and combination of elements hereinafter set forth, pointed out in my claims and illustrated by the accompanying drawing, in which—

Figure 1:
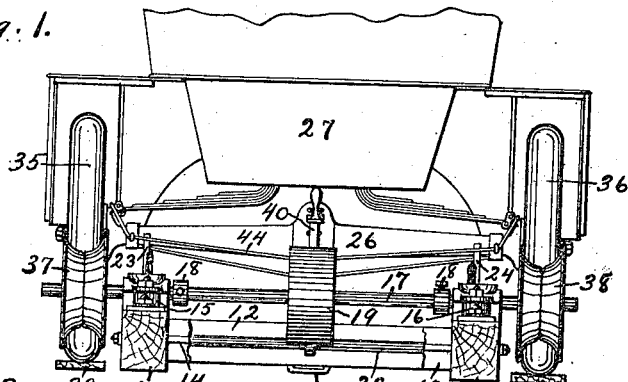
Figure 2:
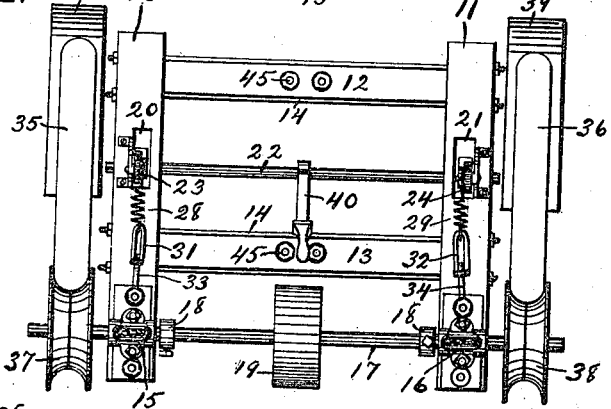
Figure 3:
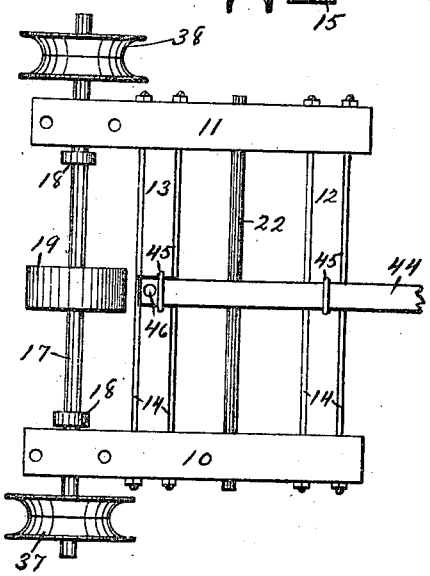
Figure 4:
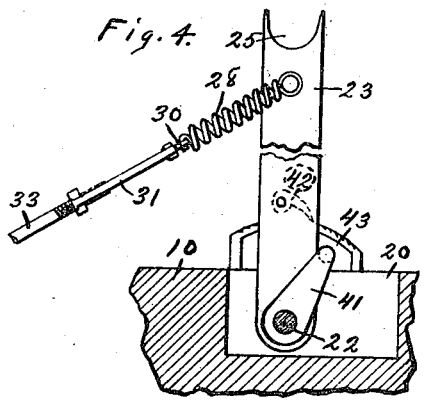

Figure 1 is a rear elevation showing the attachment in position for practical use. Fig. 2 is a plan of the same, the drive wheels only of the automobile being shown. Fig. 3 is a plan showing the attachment inverted and positioned for transportation. Fig. 4 is a detail sectional elevation showing one of the lifting jacks.

In the construction of the mechanism as shown a frame is formed of sills 10, 11 connected by cross-bars 12, 13 and rods 14. Bearings 15, 16 are mounted on the rear ends of the sills 10, 11, and a shaft 17 is arranged transversely of the rear portion of the frame and journaled for rotation in said bearings. Collars 18 are set on the shaft 17 between the bearings 15, 16 and slightly spaced therefrom, so that slight longitudinal shifting of the shaft is permitted. A belt pulley 19 is fixed to the central portion of the shaft, and is adapted for transmitting power from said shaft to any desired mechanism, such as a circular saw, a hay-press, a churn, or any device to be driven. Vertical mortises 20, 21 are formed in the sills 10, 11 forward of the bearings 15, 16, and a shaft 22 is mounted transversely between said sills and has its end portions journaled in said sills adjacent said mortises. Lifting jacks 23, 24 are mounted in the mortises 20, 21 respectively, and have their lower ends pivoted on the shaft 22, the upper ends of said jacks extending materially above the frame. The jacks 23, 24 are formed at their upper ends with curved seats 25 (Fig. 4) adapted to engage the fixed tubular rear axle 26 of an automobile, designated generally by the numeral 27. Springs 28, 29 are pivotally secured at one end adjacent the upper end of the jacks 23, 24, and have their other ends detachably hooked or otherwise secured to an eye such as 30 swiveled in the ends of turnbuckles 31, 32, the opposite ends of said turnbuckles being threaded to rods 33, 34 which are secured to the frame adjacent the bearings 15, 16. In this manner a connection is formed between the frame and the upper end portions of the jacks 23, 24, and such connection is yielding, because of the springs 28, 29; is detachable through the connection of said springs to the eyes 30; and is adjustable by turning of the turnbuckles 31, 32. When the axle 26 is mounted in the seats 25 and supported by the jacks 23, 24, the rear drive wheels 35, 36 of the automobile are lifted clear of the ground or other supporting surface, and frictionally engage grooved pulleys 37, 38 respectively, which are mounted on and fixed to end portions of the shaft 17; and when the engine of the automobile is operated the rear wheels drive said pulleys to the end of rotating said shaft and transmitting power through the pulley 19, and connected devices, to the device to be driven. The pulleys 37, 38 preferably are split, or formed of mating members in a common manner, so that the members thereof may be adjusted to adjust the width of the pulleys to cause them to fit tires or automobile wheels of all sizes. It is to be understood that the pulleys are so constructed as to snugly fit and engage the tires or other tread members of the drive wheels 35, 36.

In practical use, to position the automobile wheels for use with the device, the connecting means between the frame and upper ends of the jacks 23, 24 are first released, by loosening the turnbuckles 31, 32 and detaching the springs 28, 29 from the eyes 30. The jacks 23, 24 are then moved to their forward positions, inclining forwardly at angles of approximately 45 degrees to the horizontal plane of the frame. The automobile 27 is then backed toward the device, the rear wheels 35, 36 preferably moving upon blocks 39 positioned in front of the frame, said blocks preferably being formed with inclined forward ends. The axle 26 engages the seats 25 of the forwardly inclined jacks, and further rearward movement of the vehicle causes said axle to ride up on said jacks, which move rearwardly at their upper ends, thereby lifting the wheels 35, 36 clear of the ground or supporting surface. It is to be understood that a very little elevation of the wheels is sufficient for the purpose. The springs 28, 29 are then hooked into the eyes 30, and the turnbuckles 31, 32 are tightened to the desired extent, thus maintaining the jacks 23, 24 in their upright positions as shown, and holding the rear end of the automobile in elevated position. It is the function of the springs 28, 29, which are relatively stiff, to permit a slight forward movement of the jacks at times and thus a disengagement of the wheels 35, 36 from the pulleys 37, 38, which yielding is desirable in case an obstruction such as a stone or other hard object falls between said pulleys and wheels, or either of them.

If desired positive means may be provided for raising the axle 26 on the jacks 23, 24, independently of the power generated by the motor of the vehicle. To this end a hand lever 40 is fixed to the central portion of the shaft 22. Cam devices 41 (see Fig. 4) are fixed to the shaft 22 within the mortises 20, 21, and are provided with means for engaging the jacks 23, 24, above the pivots thereof, for the purpose of manually raising said jacks, and the load carried thereby, from the forwardly inclined to the upright position. If desired, pawls 42 may be pivoted on the jacks 23, 24, and engage segments 43 carried by the sills, to assist in holding the jacks and their load during and between successive portions of the manual lifting operation. In this connection it should be remembered that the rear end of the vehicle need be raised only a slight distance.

After the lifting operation has been completed, and the connections established between the frame and upper ends of the jacks, the pawls 42 may be disengaged from the ratchets 43 to permit the yielding of said connections as hereinbefore described.

It is desirable to provide means for transporting the device without lifting it into a vehicle, and to this end I have provided a detachable tongue 44 (Fig. 3), which may be inserted within loops 45 slidingly mounted through the cross-bars 12, 13, and be held by a bolt or pin 46 passing through said tongue and one of said cross-bars. The loops 45 and tongue 44 are mounted on the bottom side of the frame, and for transportation the device is inverted and the pulleys 37, 38 provide supporting wheels therefor, the tongue 44 being provided with draft means for securing it behind the vehicle 27 or other traction means. For this purpose the jacks 23, 24 may be removed, or turned to such position that they do not project beyond the horizontal planes of the margins of the pulleys 37, 38.

If deemed necessary or desirable, the axle 26 of the vehicle may be strengthened by the addition of a truss rod such as 44 engaging at its central portion the differential housing.

I claim as my invention—

1. A device of the class described, comprising a frame, a shaft journaled therein, a transmission pulley on said shaft, spaced drive pulleys fixed to said shaft and adapted for frictional contact with the drive wheels of a vehicle, devices pivoted in said frame and adapted to be inclined forwardly to engage the rear axle of a vehicle and also adapted to be moved to upright supporting position by rearward movement of the vehicle, and yielding means for holding said devices in upright position.

2. A device of the class described, comprising a horizontal frame, a shaft journaled therein, a transmission pulley on said shaft, drive pulleys on said shaft and adapted for frictional contact with the drive wheels of a vehicle, said drive pulleys being grooved and adjustable as to width, jack devices pivoted at their lower ends on said frame and adapted to engage and support the rear axle of a vehicle said jack devices being adapted for forward inclination to engage said axle while the vehicle wheels are resting on the supporting surface and being movable to upright position to support the rear vehicle wheels clear of the supporting surface, and means for holding said devices in upright position.

3. A device of the class described, comprising a frame, a shaft journaled for rotation therein, a transmission device on said shaft, drive pulleys fixed to said shaft and adapted for frictional engagement with the drive wheels of a vehicle, lifting jacks pivoted in said frame and adapted for forward inclination at times, said jacks being formed with seats to engage the axle of a vehicle, and detachable connections between the upper end portions of said jacks and the rear portion of the frame, such connections including yielding pressure devices and also independent means for adjusting the length thereof.

4. A device of the class described, comprising a frame, a shaft journaled therein, a transmission device on said shaft, drive pulleys fixed to said shaft and adapted for frictional engagement with the drive wheels of a vehicle, lifting jacks pivoted in said frame and adapted for forward inclination at times, said jacks being provided with seats for the axle of a vehicle, a second shaft journaled in the frame parallel with the first shaft and adjacent said jacks, means for manually oscillating said shaft, and means on said shaft for engaging and raising said jacks.

Signed by me at Webster City, Iowa, this fourteenth day of December, 1916.

CHARLES JONES.

Copies of this patent may be obtained for five cents each, by addressing the "Commissioner of Patents, Washington, D. C."